(12) United States Patent
Paytas

(10) Patent No.: US 12,447,910 B2
(45) Date of Patent: Oct. 21, 2025

(54) IMPLEMENT MOUNTING DEVICE

(71) Applicant: Mark Paytas, Roseville, MI (US)

(72) Inventor: Mark Paytas, Roseville, MI (US)

( * ) Notice: Subject to any disclaimer, the term of this patent is extended or adjusted under 35 U.S.C. 154(b) by 493 days.

(21) Appl. No.: 18/084,697

(22) Filed: Dec. 20, 2022

(65) Prior Publication Data

US 2024/0198927 A1    Jun. 20, 2024

(51) Int. Cl.
| | |
|---|---|
| *B60R 11/06* | (2006.01) |
| *A63B 55/60* | (2015.01) |
| *B62D 65/02* | (2006.01) |
| *E01H 5/06* | (2006.01) |
| *B60R 11/00* | (2006.01) |

(52) U.S. Cl.
CPC .............. *B60R 11/06* (2013.01); *A63B 55/61* (2015.10); *B62D 65/02* (2013.01); *E01H 5/061* (2013.01); *B60R 2011/004* (2013.01); *B60R 2011/0052* (2013.01)

(58) Field of Classification Search
CPC ......... E01H 5/061; A63B 55/61; B60R 11/06; B60R 2011/0052; B62D 65/02
See application file for complete search history.

(56) References Cited

U.S. PATENT DOCUMENTS

| | | | |
|---|---|---|---|
| 3,201,878 A | 8/1965 | Markwardt | |
| 4,159,584 A * | 7/1979 | Niemela | E01H 5/066 |
| | | | 280/481 |
| 5,329,708 A * | 7/1994 | Segorski | E01H 5/06 |
| | | | 37/231 |
| 5,950,335 A * | 9/1999 | Okajima | A43B 5/0447 |
| | | | 36/89 |
| 5,950,336 A | 9/1999 | Liebl | |
| 6,502,334 B1 * | 1/2003 | Davies | E01H 5/06 |
| | | | 37/231 |
| 6,925,735 B2 | 8/2005 | Hamm | |
| 6,964,121 B2 | 11/2005 | Harris | |
| D533,326 S | 12/2006 | Sugai | |

FOREIGN PATENT DOCUMENTS

WO    WO2004063079    7/2004

* cited by examiner

*Primary Examiner* — Abiy Teka

(57) ABSTRACT

An implement mounting device for use in attaching an implement to a golf cart includes a bracket, which is mountable to a frame of a golf cart proximate to a front end of the frame. The bracket also is selectively attachable to an implement, such as a snowplow, so that the implement is removably mounted to the golf cart. The bracket thus fixes an implement to a golf cart, thereby enabling a user to perform a task, such as moving snow, with the implement.

6 Claims, 7 Drawing Sheets

IMPLEMENT MOUNTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mounting devices and more particularly pertains to a new mounting device for use in attaching an implement to a golf cart. The present invention discloses a mounting device, which can be readily attached to a frame of a golf cart and which allows for mounting of a snowplow to the golf cart.

(2) Description of Related Art Including Information Disclosed Under 37 CFR 1.97 and 1.98

The prior art relates to mounting devices. Prior art mounting devices including mounting brackets for various types of vehicles, including trucks, all-terrain vehicles, utility vehicles, and the like, wherein the mounting brackets can be used for attaching plows to the vehicles. The prior art does not teach a mounting bracket for a front end of a golf cart that can be used to mount an implement, and particularly a plow. Golf carts are designed for designed for a specific task, that being conveying players upon a golf course, and it would not be anticipated that a golf cart could be modified with a mounting bracket to allow attachment of implements, in particular a plow for moving snow as golf carts are typically used in warmer weather.

BRIEF SUMMARY OF THE INVENTION

An embodiment of the disclosure meets the needs presented above by generally comprising a bracket, which is configured to be mounted to a frame of a golf cart proximate to a front end of the frame. The bracket also is configured to selectively attach to an implement, such as a snowplow, so that the implement is removably mounted to the golf cart. The bracket thus is configured to attach an implement to a golf cart, thereby enabling a user to perform a task, such as moving snow, with the implement.

Another embodiment of the disclosure includes an implement mounting system, which comprises a bracket mounted to a frame of a golf cart proximate to a front end of the frame. An implement, such as a snowplow, is attached to the bracket so that a user is enabled to perform a task with the implement.

Yet another embodiment of the disclosure includes a method of mounting an implement to a golf cart. The method comprises first and second provision steps, which entail providing a golf cart and an implement, and an implement mounting device, according to the disclosure above, respectively. First and second installation steps are mounting the bracket to the frame of the golf cart and mounting the implement to the bracket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
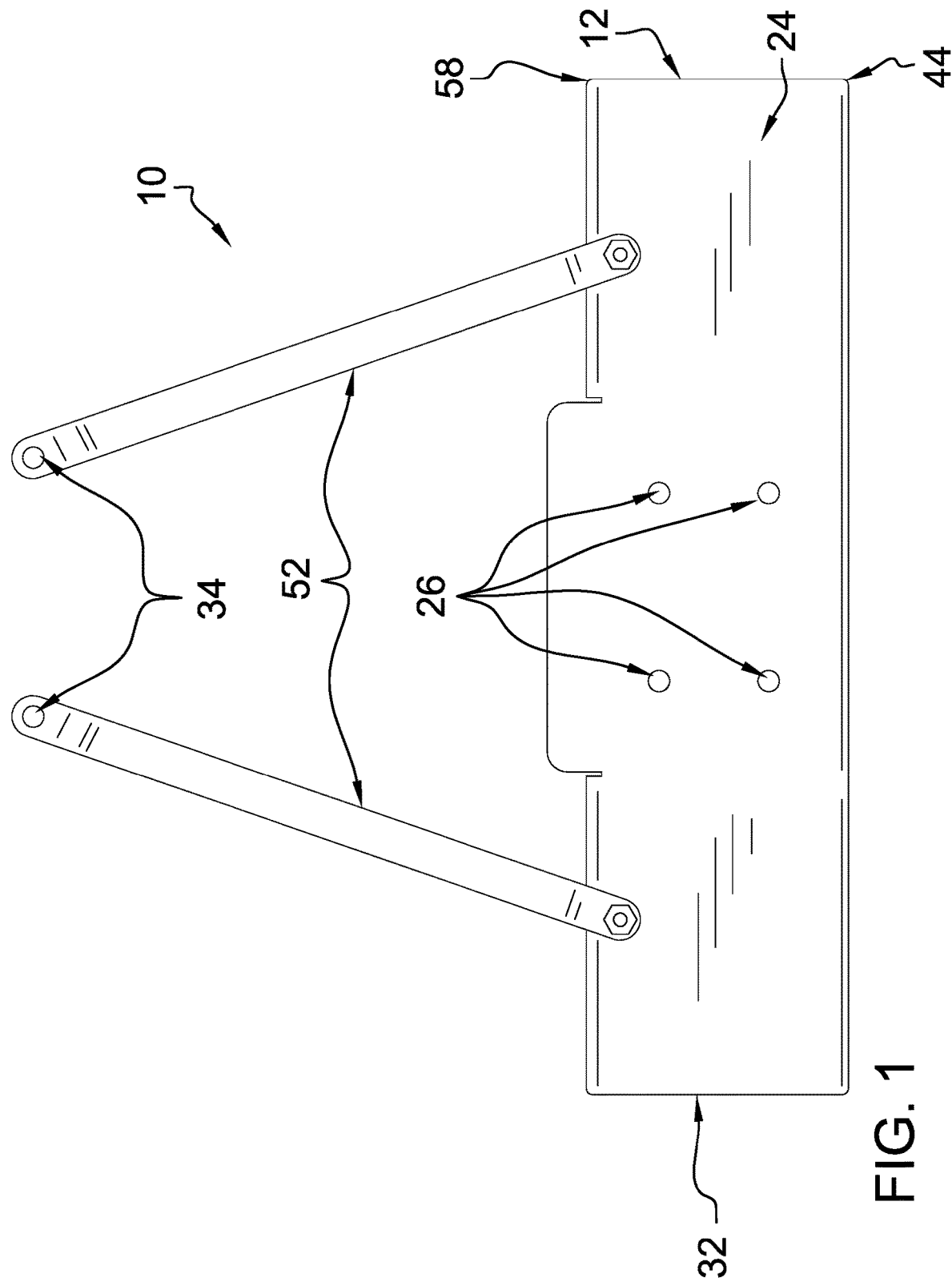
FIG. 1 is a top view of an implement mounting device according to an embodiment of the disclosure.
Figure 2:
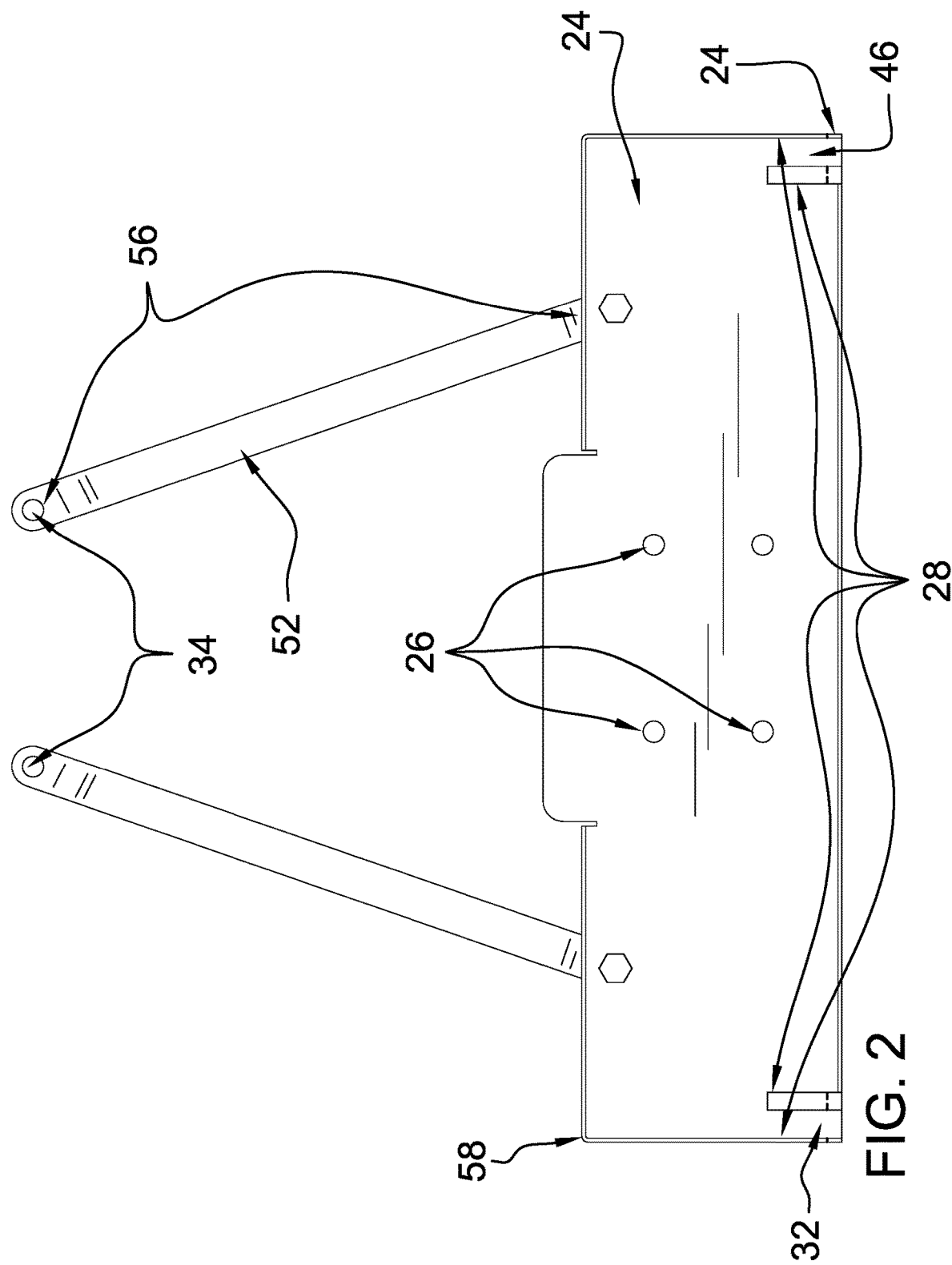
FIG. 2 is a bottom view of an embodiment of the disclosure.

With reference now to the drawings, and in particular to FIGS. 1 through 8 thereof, a new mounting device embodying the principles and concepts of an embodiment of the disclosure and generally designated by the reference numeral 10 will be described.

Figure 6:
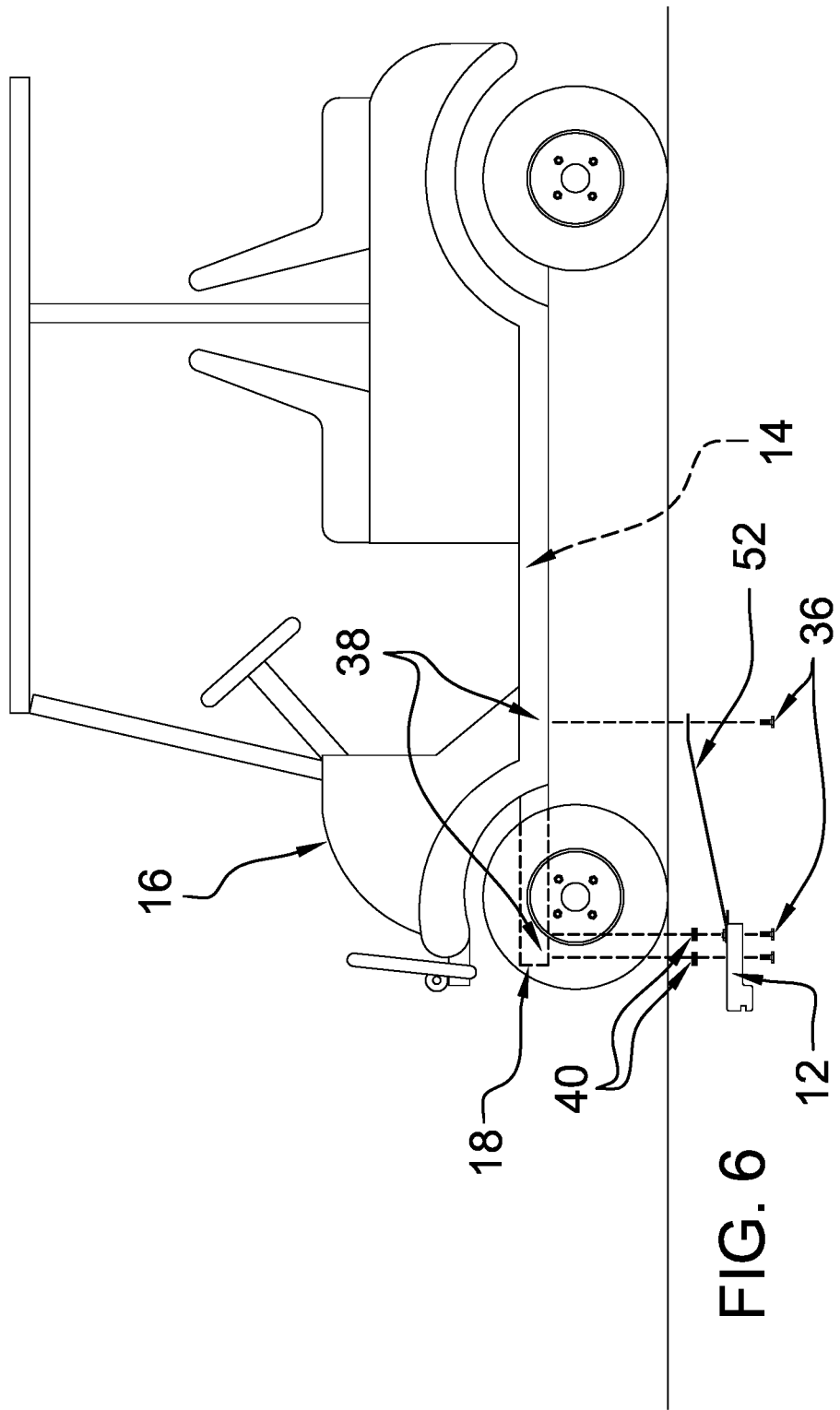
FIG. 6 is an in-use view of an embodiment of the disclosure.
Figure 7:
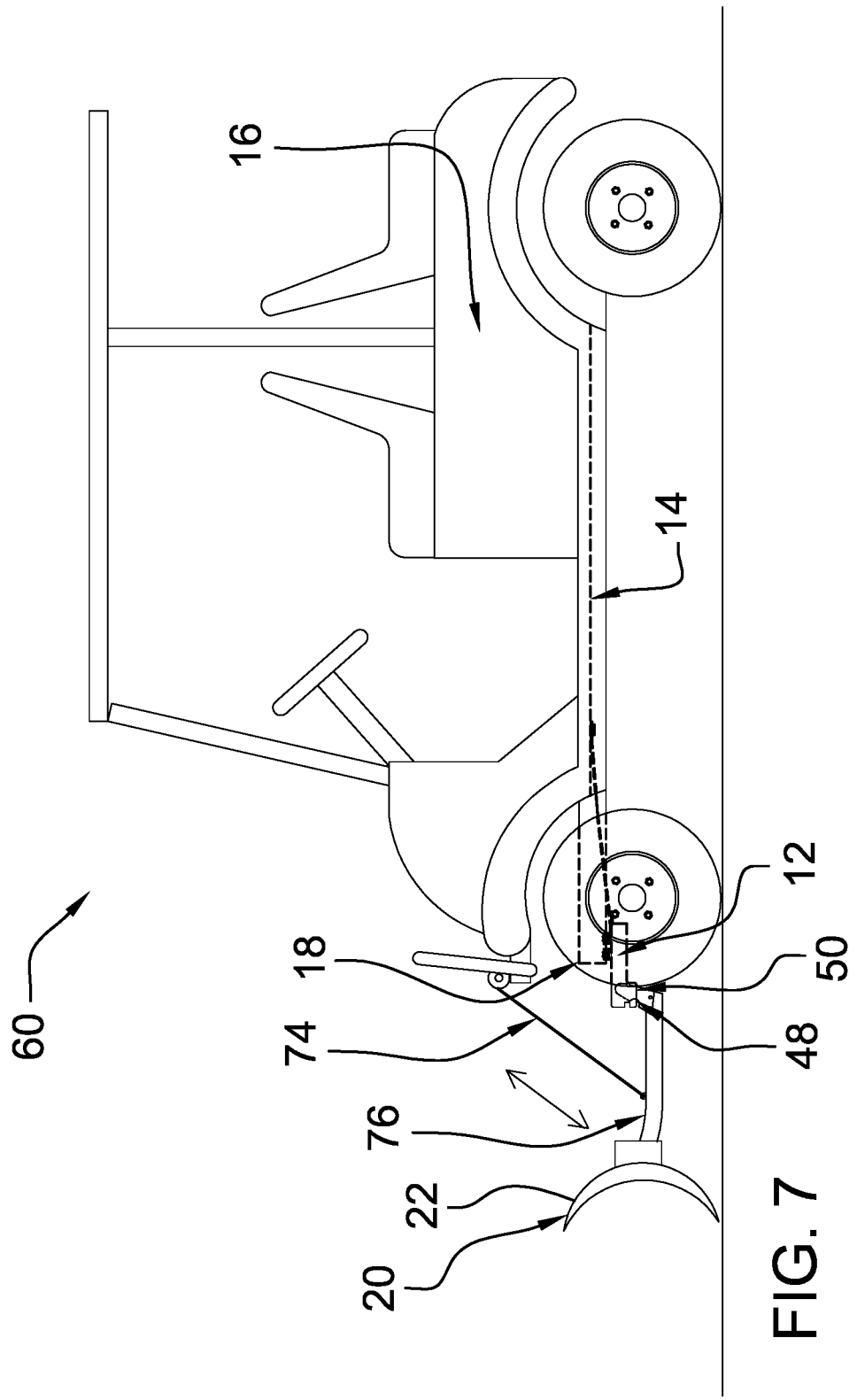
FIG. 7 is an in-use view of an embodiment of the disclosure.
Figure 8:
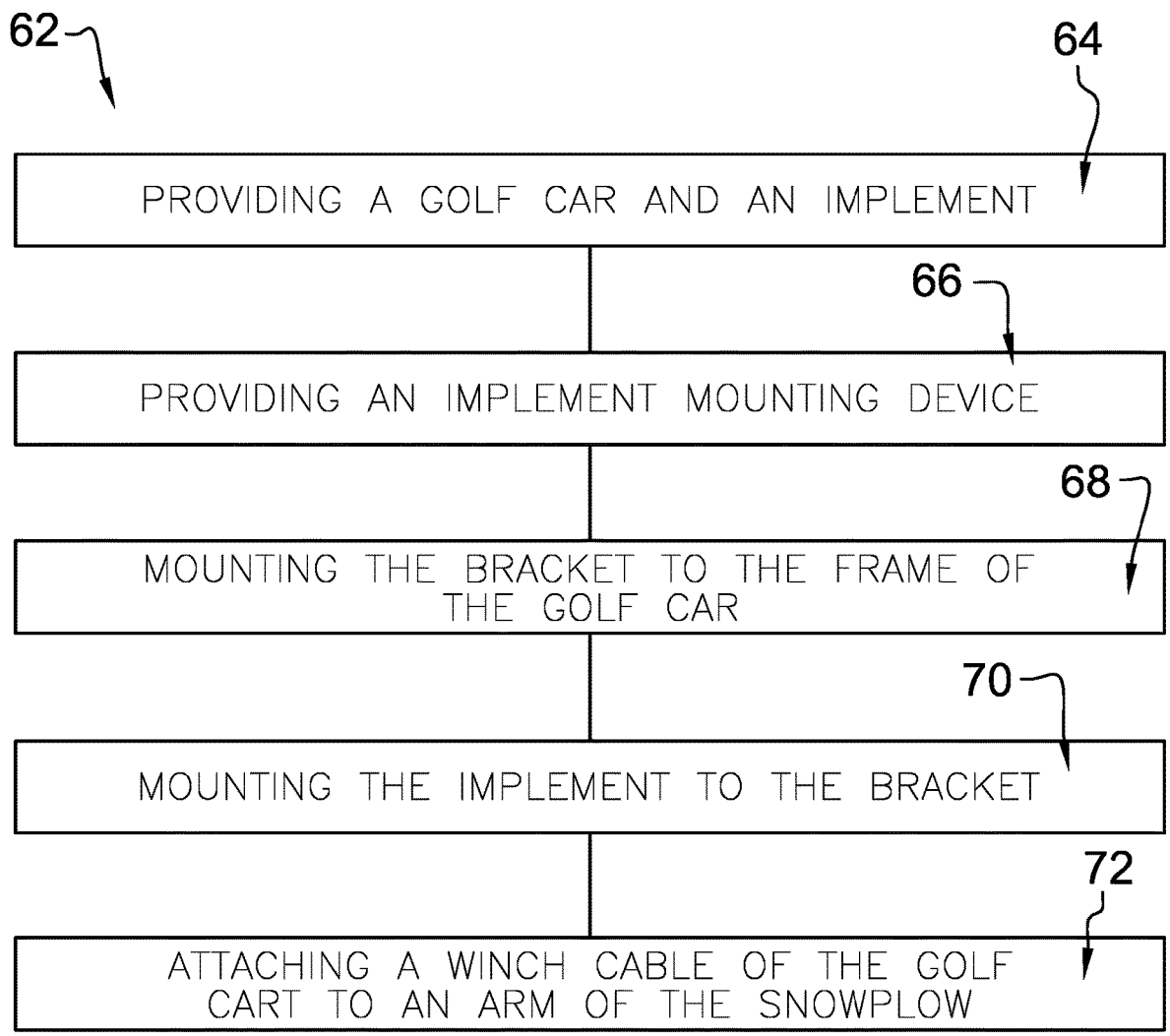
FIG. 8 is a flow diagram for a method utilizing an embodiment of the disclosure.

As best illustrated in FIGS. 1 through 8, the implement mounting device 10 generally comprises a bracket 12, which is configured to be mounted to a frame 14 of a golf cart 16 proximate to a front end 18 of the frame 14. The bracket 12 also is configured to selectively attach to an implement 20, such as a snowplow 22, as shown in FIG. 7, so that the implement 20 is removably mounted to the golf cart 16. The bracket 12 thus is configured to attach an implement 20 to a golf cart 16, thereby enabling a user to perform a task, such as moving snow, with the implement 20.

A variety of configurations of the bracket 12 are anticipated so as to complement a variety of models of golf carts 16. For example, the bracket 12 may comprise a plate 24, a first coupler 26, and a second coupler 28. The plate 24 is elongated and substantially rectangular. A rim 30 is attached to and extends circumferentially around a perimeter 32 of the plate 24 to stiffen the plate 24. The first coupler 26 is attached to the plate 24 and is configured to selectively couple to the frame 14 of the golf cart 16. The first coupler 26 may comprise a plurality of attachment holes 34, which is positioned in the plate 24, and a plurality of bolts 36. Each bolt 36 is positioned for insertion through a respective attachment hole 34 and configured for threaded insertion into an associated cart hole 38 to removably mount the plate 24 to the frame 14.

The cart holes 38 may be preexisting or generated in the frame 14 by drilling and tapping. The present invention also anticipates other attachment means for attaching the plate 24 to the frame 14, such as, but not limited to, welding, bolting through the frame 14 using nuts, and the like. Each spacer 40 of a plurality of spacers 40 is selectively positionable around a respective attachment hole 34, between the plate 24 and the frame 14 to tilt the plate 24, selectively and fixedly, relative to the frame 14.

The second coupler 28 is configured to selectively attach to the implement 20 so that the implement 20 is removably mounted to the golf cart 16. The second coupler 28 may comprise a plurality of tabs 42, which is attached to the plate 24 so that two tabs 42 are positioned proximate to each front corner 44 of the plate 24. The plurality of tabs 42 defines a pair of slots 46, with each slot 46 being configured for insertion of an element 48 of an attachment interface 50 of the implement 20 to removably attach the implement 20 to the plate 24. Many configurations of attachment receivers for implements 20 are known to those skilled in the art of implement attachment and these configurations are anticipated as second couplers 28 by the present invention.

Figure 3:
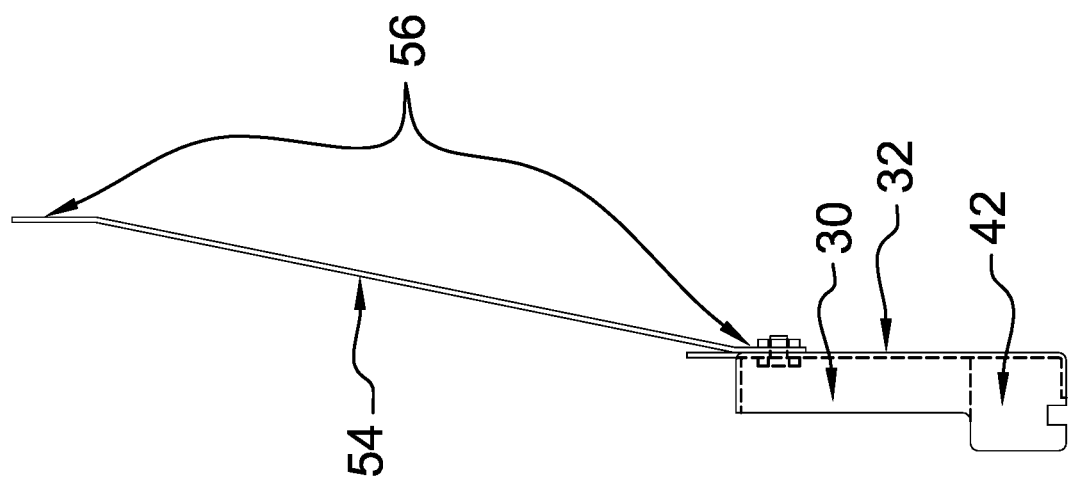
FIG. 3 is a side view of an embodiment of the disclosure.
Figure 4:
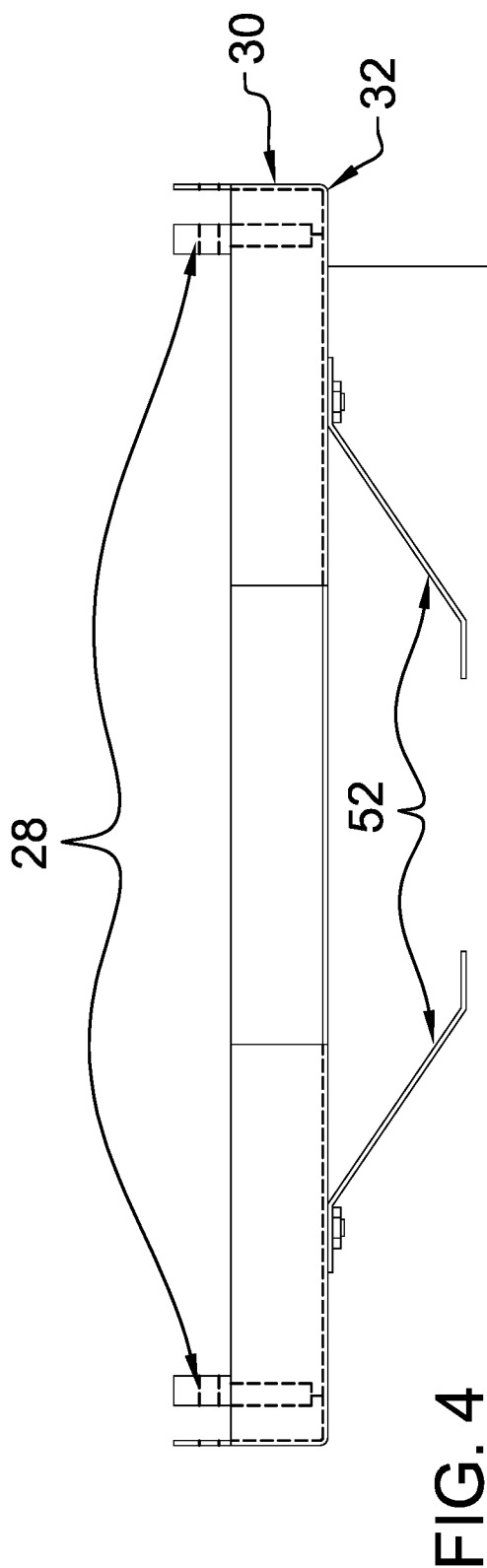
FIG. 4 is a rear view of an embodiment of the disclosure.
Figure 5:
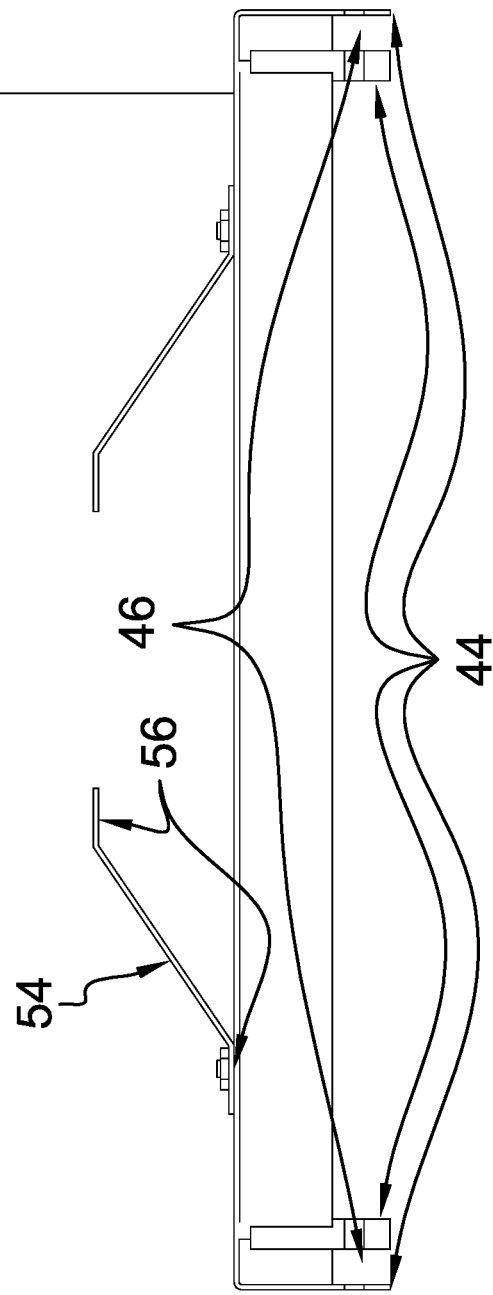
FIG. 5 is a front view of an embodiment of the disclosure.

Each bar 52 of a pair of bars 52 comprises a medial section 54 that extends angularly between a pair of end sections 56 so that the end sections 56 are substantially parallel planar, as shown in FIG. 4. A respective end section 56 of each bar 52 is rotationally attached to the plate 24 proximate to a respective rear corner 58 of the plate 24, as shown in FIG. 1. As shown in FIG. 3, the bars 52 are bolted to the plate 24, which allows the bars to be rotated into position prior to final tightening. A pair of attachment holes 34 is positioned singly in the end sections 56 distal from the plate 24 so that each attachment hole 34 is positioned for insertion of a respective bolt 36 of the plurality of bolts 36. The respective bolt 36 is configured for threaded insertion into an associated cart hole 38 to removably attaching an associated bar 52 to the frame 14, as shown in FIG. 6. The present invention also anticipates the bars 52 being attached to the frame 14 by welding, bolting through the frame 14 using nuts, and the like.

The present invention anticipates an implement mounting system 60, which comprises a bracket 12 mounted to a frame 14 of a golf cart 16 proximate to a front end 18 of the frame 14. An implement 20 is attached to the bracket 12 so that a user is enabled to perform a task with the implement 20. The implement 20 may comprise a snow moving tool, such as a snowplow 22, as shown in FIG. 7, a snow thrower, or the like.

In use, the implement mounting device 10 enables a method of mounting an implement to a golf cart 62. The method 62 comprises a first provision step 64, which entails providing is providing a golf cart 62 and an implement 20. A second provision step 68 of the method 62 is providing an implement mounting device 10, according to the specification above. A first installation step 66 of the method 62 is mounting the bracket 12 to the frame 14 of the golf cart 16. A second installation step 70 of the method 62 is mounting the implement 20 to the bracket 12. When the implement 20 comprises a snowplow 22, an additional step 72 of the method 62 is attaching a winch cable 74 of the golf cart 16 to an arm 76 of the snowplow 22, as shown in FIG. 7. The snowplow 22 thus can be raised and lowered by winching.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. An implement mounting device comprising:
   a bracket configured to be mounted to a frame of a golf cart proximate to a front end of the frame, the bracket being configured for selectively attaching to an implement, such that the implement is removably mounted to the golf cart, wherein the bracket is configured for attaching the implement to the golf cart, enabling a user to perform a task with the implement;
   wherein the bracket comprises
      a plate,
      a first coupler attached to the plate and being configured for selectively coupling to the frame of the golf, and
      a second coupler configured for selectively attaching to the implement, such that the implement is removably mounted to the golf cart;
   the plate being elongated and rectangular; and
   a rim attached to and extending circumferentially around a perimeter of the plate, such that the rim stiffens the plate.
2. An implement mounting device comprising:
   a bracket configured to be mounted to a frame of a golf cart proximate to a front end of the frame, the bracket being configured for selectively attaching to an implement, such that the implement is removably mounted to the golf cart, wherein the bracket is configured for attaching the implement to the golf cart, enabling a user to perform a task with the implement;
   wherein the bracket comprises
      a plate, a first coupler attached to the plate and being configured for selectively coupling to the frame of the golf, and
a second coupler configured for selectively attaching to the implement, such that the implement is removably mounted to the golf cart; and
wherein the first coupler comprises
a plurality of attachment holes positioned in the plate, and
a plurality of bolts, such that each bolt is positioned for insertion through a respective attachment hole, wherein the respective bolt is configured for threaded insertion into an associated cart hole for removably mounting the plate to the frame.

3. The implement mounting device of claim 2, further including a plurality of spacers, each spacer being selectively positionable around a respective attachment hole between the plate and the frame of the golf cart for selectively and fixedly tilting the plate relative to the frame.

4. An implement mounting device comprising:
a bracket configured to be mounted to a frame of a golf cart proximate to a front end of the frame, the bracket being configured for selectively attaching to an implement, such that the implement is removably mounted to the golf cart, wherein the bracket is configured for attaching the implement to the golf cart, enabling a user to perform a task with the implement;
wherein the bracket comprises
a plate,
a first coupler attached to the plate and being configured for selectively coupling to the frame of the golf, and
a second coupler configured for selectively attaching to the implement, such that the implement is removably mounted to the golf cart; and
wherein the second coupler comprises a plurality of tabs attached to the plate, such that two tabs are positioned proximate to each front corner of the plate, such that the plurality of tabs defines a pair of slots, wherein each slot is configured for insertion of an element of an attachment interface of the implement for removably attaching the implement to the plate.

5. The implement mounting device of claim 2, further including:
a pair of bars, each bar comprising a medial section extending angularly between a pair of end sections, such that the end sections are parallel planar, a respective end section of each bar being rotationally attached to the plate proximate to a respective rear corner of the plate; and
a pair of attachment holes positioned singly in the end sections distal from the plate, such that each attachment hole is positioned for insertion of a respective bolt of the plurality of bolts, wherein the respective bolt is configured for threaded insertion into an associated cart hole for removably attaching an associated bar to the frame.

6. An implement mounting device comprising:
a bracket configured to be mounted to a frame of a golf cart proximate to a front end of the frame, the bracket being configured for selectively attaching to an implement, such that the implement is removably mounted to the golf cart, wherein the bracket is configured for attaching the implement to the golf cart, enabling a user to perform a task with the implement;
the bracket comprising:
a plate, the plate being elongated and rectangular,
a rim attached to and extending circumferentially around a perimeter of the plate, such that the rim stiffens the plate,
a first coupler attached to the plate and being configured for selectively coupling to the frame of the golf cart, the first coupler comprising:
a plurality of attachment holes positioned in the plate, and
a plurality of bolts, such that each bolt is positioned for insertion through a respective attachment hole, wherein the respective bolt is configured for threaded insertion into an associated cart hole for removably mounting the plate to the frame, and
a plurality of spacers, each spacer being selectively positionable around a respective attachment hole between the plate and the frame of the golf cart for selectively and fixedly tilting the plate relative to the frame;
a second coupler configured for selectively attaching to the implement, such that the implement is removably mounted to the golf cart, the second coupler comprising:
a plurality of tabs attached to the plate, such that two tabs are positioned proximate to each front corner of the plate, such that the plurality of tabs defines a pair of slots, wherein each slot is configured for insertion of an element of an attachment interface of the implement for removably attaching the implement to the plate;
a pair of bars, each bar comprising a medial section extending angularly between a pair of end sections, such that the end sections are parallel planar, a respective end section of each bar being rotationally attached to the plate proximate to a respective rear corner of the plate; and
a pair of attachment holes positioned singly in the end sections distal from the plate, such that each attachment hole is positioned for insertion of a respective bolt of the plurality of bolts, wherein the respective bolt is configured for threaded insertion into an associated cart hole for removably attaching an associated bar to the frame.

* * * * *